US008958798B2

(12) United States Patent
Takubo et al.

(10) Patent No.: US 8,958,798 B2
(45) Date of Patent: Feb. 17, 2015

(54) RADIO ACCESS NETWORK, BASE STATION, AND DATA TRANSFER METHOD

(75) Inventors: Hiroshi Takubo, Fukuoka (JP); Hirotoshi Saiki, Fukuoka (JP); Takumi Sasatani, Fukuoka (JP); Masafumi Bono, Fukuoka (JP)

(73) Assignee: Fujitsu, Limited, Kawasaki (JP)

( * ) Notice: Subject to any disclaimer, the term of this patent is extended or adjusted under 35 U.S.C. 154(b) by 333 days.

(21) Appl. No.: 13/398,584

(22) Filed: Feb. 16, 2012

(65) Prior Publication Data

US 2012/0149375 A1 Jun. 14, 2012

Related U.S. Application Data

(63) Continuation of application No. PCT/JP2009/004044, filed on Aug. 21, 2009.

(51) Int. Cl.
*H04W 36/00* (2009.01)
*H04W 24/10* (2009.01)
*H04W 36/02* (2009.01)

(52) U.S. Cl.
CPC .......... *H04W 24/10* (2013.01); *H04W 36/0083* (2013.01); *H04W 36/023* (2013.01)
USPC ..................... 455/436; 455/412.1; 455/452.2; 370/310

(58) Field of Classification Search
CPC ..... H04W 36/08; H04W 36/18; H04W 24/10; H04W 36/02; H04W 36/30; H04L 1/1874; H04L 1/18; H04L 45/16
USPC ........... 455/562.1, 436, 438, 277.1, 442, 466, 455/560, 412.1, 67.11, 432.1, 66.1; 370/331, 335, 280, 236, 342, 334, 310; 342/457, 357.2; 380/46; 375/354, 219, 375/220

See application file for complete search history.

(56) References Cited

U.S. PATENT DOCUMENTS

| | | | | |
|---|---|---|---|---|
| 5,471,670 A | * | 11/1995 | Hess et al. ..................... | 455/437 |
| 6,321,089 B1 | * | 11/2001 | Han ............................... | 455/438 |
| 6,529,733 B1 | * | 3/2003 | Qing-An ........................ | 455/437 |
| 6,956,837 B1 | * | 10/2005 | Lee ................................ | 370/331 |
| 2004/0192221 A1 | * | 9/2004 | Matsunaga .................... | 455/76 |

(Continued)

FOREIGN PATENT DOCUMENTS

EP 1 954 067 A1 8/2008
EP 2 063 651 5/2009

(Continued)

OTHER PUBLICATIONS

International Search Report issued for corresponding International Patent Application No. PCT/JP2009/004044, mailed Sep. 29, 2009.

(Continued)

*Primary Examiner* — Mahendra Patel
(74) *Attorney, Agent, or Firm* — Myers Wolin, LLC

(57) ABSTRACT

A radio access network includes a storage that stores data to be transferred from a base station to a mobile station. When an intensity of a signal received by the mobile station from the base station falls below a threshold, receiving an indication indicating the intensity from the mobile station, and when a plurality of indications are received, an amount of data transferable to the mobile station until a communication with the mobile station becomes unavailable is calculated, based on the indications and times when the indications are received, and the data is transferred to the mobile station in the calculated amount or smaller.

7 Claims, 8 Drawing Sheets

(56) References Cited

U.S. PATENT DOCUMENTS

| | | | |
|---|---|---|---|
| 2006/0019609 A1* | 1/2006 | Finley et al. .................... 455/68 |
| 2006/0121914 A1* | 6/2006 | Kim et al. .................. 455/456.1 |
| 2007/0064633 A1* | 3/2007 | Fricke .......................... 370/310 |
| 2008/0019332 A1* | 1/2008 | Oswal et al. .................. 370/338 |
| 2008/0113692 A1* | 5/2008 | Zhao et al. .................... 455/574 |
| 2009/0028111 A1 | 1/2009 | Chao et al. |
| 2009/0233606 A1* | 9/2009 | Park et al. .................... 455/437 |
| 2010/0091654 A1 | 4/2010 | Ohno et al. |
| 2010/0197308 A1* | 8/2010 | Racz et al. .................... 455/436 |

FOREIGN PATENT DOCUMENTS

| | | |
|---|---|---|
| JP | 11-146464 | 5/1999 |
| JP | 2001-292481 | 10/2001 |
| JP | 2003-018658 | 1/2003 |
| JP | 2003-153327 | 5/2003 |
| JP | 2005-012300 | 1/2005 |
| JP | 2008-022309 | 1/2008 |
| JP | 2008-098880 | 4/2008 |
| WO | 2009/008037 A1 | 1/2009 |

OTHER PUBLICATIONS

The extended European search report, the supplementary European search report and the European search opinion issued for corresponding European Patent Application No. 09848459.5 dated Oct. 21, 2014.

* cited by examiner

RADIO ACCESS NETWORK, BASE STATION, AND DATA TRANSFER METHOD

CROSS-REFERENCE TO RELATED APPLICATION

This application is a continuation Application of a PCT international application No. PCT/JP2009/004044 filed on Aug. 21, 2009 in Japan, the entire contents of which are incorporated by reference.

FIELD

The embodiments discussed herein are related to a data transfer technique upon handover processing between base stations.

BACKGROUND

In a mobile communication network, mobile stations, such as mobile telephones, handover between base stations, in order to continue communications when the mobile stations are migrating.

When a handover is made while packets are received from a base station, problems, such as packet losses, may occur because radio waves from the base station before handover become weakened, for example.

Accordingly, techniques to prevent packet losses have been proposed. For example, one technique prevents packet losses by instructing mobile stations about a packet boundary which is optimal for switching between base stations (refer to Patent Reference 1).

Patent Reference 1: Japanese Laid-open Patent Publication No. 2003-153327

However, in recent years, mobile stations support web (World Wide Web) accesses, multimedia communications, and the like, and often download larger volume of data from content servers and the like.

In order to download data to a mobile station, data sent from a content server is temporally buffered by a base station or the like, before the data is transferred to the mobile station. This is because the data transfer rate between the content server and the base station or the like, is faster than the transfer rate between base station or the like and the mobile station.

If a handover takes place during downloading of data, data that is not buffered in the base station before the handover and is not yet transferred to the mobile station will not be transferred to the mobile station, since the base stations are switched.

In such a case, after the handover, the data must be downloaded once again from the beginning. In the case of data requiring the real time feature, the buffered data cannot be played back and the playback may be disrupted.

SUMMARY (1) According to an aspect of the embodiments, a network includes a radio access network including: a storage that stores data to be transferred from a base station to a mobile station; a receiver that receives, when an intensity of a signal received by the mobile station from the base station falls below a threshold, an indication indicating the intensity from the mobile station; and a transmitter that, when a plurality of indications are received by the receiver, calculates an amount of data transferable to the mobile station until a communication with the mobile station becomes unavailable, based on the indications and times when the indications are received, and transfers the data to the mobile station, the data being transferred to the mobile station in the calculated amount or smaller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
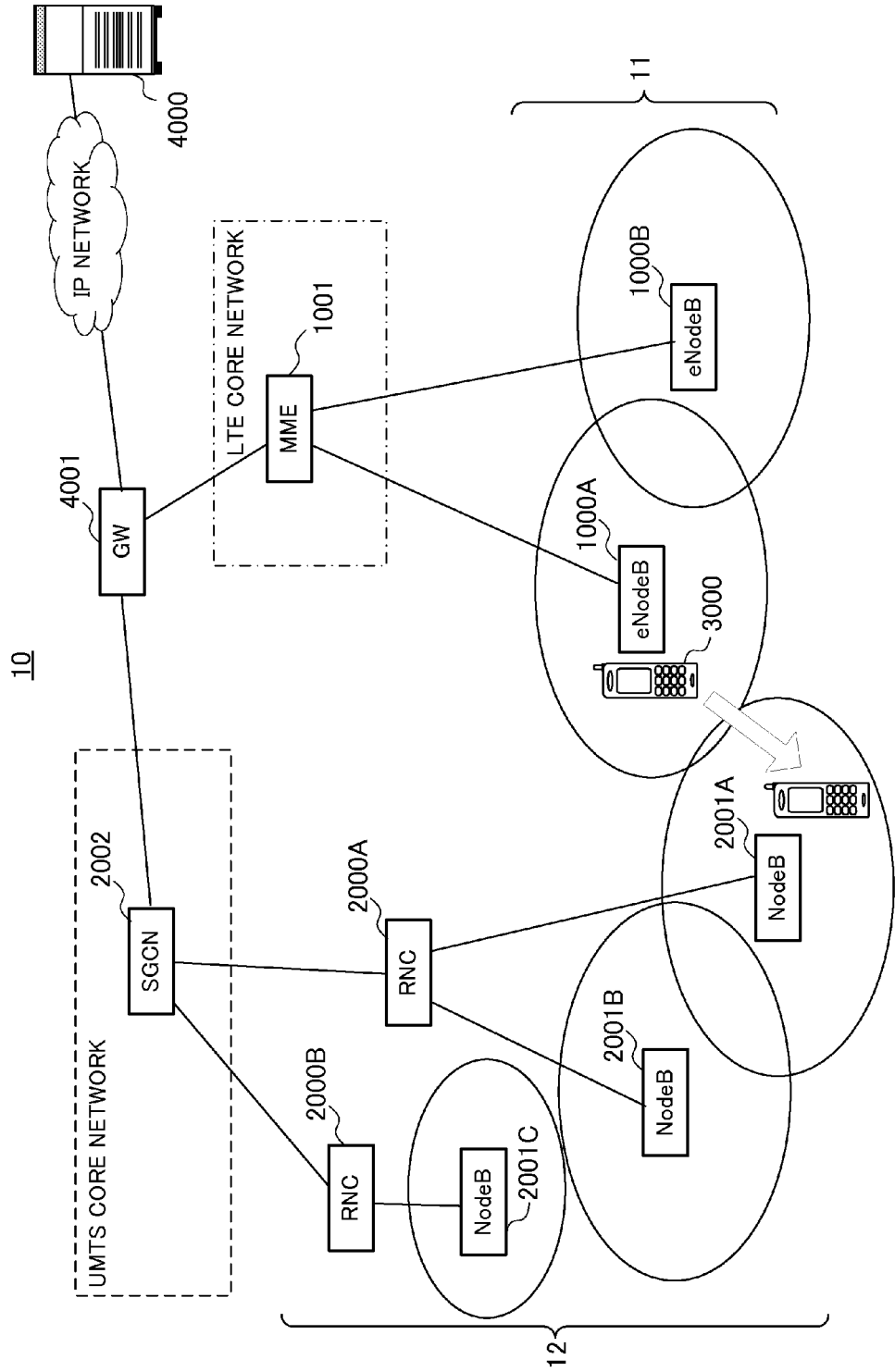
FIG. 1 is a diagram illustrating an example of the configuration of a mobile communication network of an embodiment.

FIG. 1 is a diagram illustrating an example of the configuration of a mobile communication network 10 of an embodiment.

The mobile communication network 10 includes two communication networks.

One is a long term evolution (LTE) network including a mobility management entity (MME) 1001, an eNodeB 1000A, and an eNodeB 1000B.

The other is a universal mobile telecommunication system (UMTS) network including a serving GPRS support node (SGCN) 2002, a radio network controller (RNC) 2000A, an RNC 2000B, a NodeB 2001A, a NodeB 2001B, and a NodeB 2001C.

The MME 1001 in the LTE network is an essential control node constituting the core network of the LTE network, and has functions to control paging and to control communications with a public mobile communication network via a gate way (GW) 4001. In FIG. 1, the MME 1001 communicates with an Internet service provider (ISP) 4000 through the Internet Protocol (IP) network.

The eNodeB 1000A and the eNodeB 1000B directly communicate with a mobile station 3000 in the LTE network. The eNodeBs 1000A and 1000B are generally known as base stations, and constitute a radio access network (RAN) 11 of the LTE network. In FIG. 1, the eNodeB 1000A and the eNodeB 1000B are managed by the MME 1001.

The eNodeB 1000A and the eNodeB 1000B have similar functions, and are collectively referred to as the "eNodeBs 1000" hereinafter. It is noted that the circles in the solid lines around the eNodeBs 1000 indicate the areas geographically covered by the eNodeBs 1000, i.e., generally known as cells.

The SGCN 2002 in the UMTS network constitutes the core network of the UMTS network, and has functions to perform user location management, the security management, and access controls, of the General Packet Radio Service (CPRS).

The RNC 2000A and the RNC 2000B are generally known as base station controllers, and control handovers and the like. In FIG. 1, the RNC 2000A and the RNC 2000B are managed by the SGCN 2002.

The RNC 2000A and the RNC 2000B have similar functions, and are collectively referred to as the "RNCs 2000" hereinafter.

The NodeBs 2001A, 2001B, and 2001C are generally known as base stations in the UMTS network. In FIG. 1, the NodeB 2001A and the NodeB 2001B are managed by the RNC 2000A, and the NodeB 2001C is managed by the RNC 2000B.

The NodeBs 2001A, 2001B, and 2001C have similar functions, and are collectively referred to as the "NodeBs 2001" hereinafter. It is noted that the circles in the solid lines around the NodeBs 2001 indicate the so-called cells of these NodeBs 2001.

The RNC 2000A, the RNC 2000B, and the NodeBs 2001A, 2001B, and 2001C constitute a radio access network 12 of the UMTS network.

In an embodiment, a scenario will be explained where the mobile station 3000, which is a mobile telephone downloading a content, migrates from the LTE network to the UMTS network (see the outlined allow), in other words, the mobile station 3000 handovers to a base station in a different communication network.

Hereinafter, the apparatus used before a handover is referred to as "source eNodeB 1000", for example, with the preceding "source", and an apparatus of the handover destination is referred to as a "target RNC 2000", for example, with the preceding "target".

When a content is downloaded from the ISP 4000 to the mobile station 3000 in the LTE network, content data received by the mobile station 3000 from the ISP 4000 via the GW 4001 is temporally stored in a buffer, which is a buffer memory for an eNodeB 1000. The data stored in the buffer (hereinafter referred to as "buffered data") is successively transferred to the mobile station 3000 by the eNodeB 1000.

When the mobile station 3000 downloading a content handovers in the LTE network, the data buffered in the source eNodeB 1000 is transferred to a target eNodeB 1000 during the handover. For example, if a handover takes place from the eNodeB 1000A to the eNodeB 1000B, the eNodeB 1000A directly transfers buffered data to the eNodeB 1000B during the handover. The eNodeB 1000B temporally stores the data received from the eNodeB 1000A, and then transfers the stored data to a mobile station 3000.

By following this procedure, if there is any data which was not transferred to the mobile station 3000 in the handover and remains in the buffer, the data is transferred from the target eNodeB 1000 to the mobile station 3000.

On the other hand, in the UMTS network, content data received from the ISP 4000 via the GW 4001 is stored in a buffer in an RNC 2000. The data buffered in the RNC 2000 is successively transferred to the mobile station 3000 via a NodeB 2001.

Accordingly, if the mobile station 3000 downloading a content handovers in the UMTS network, e.g., if the mobile station 3000 handovers from the NodeB 2001A to the NodeB 2001B, the RNC 2000A changes the destination of the data from the NodeB 2001A to the NodeB 2001B. Or, if the mobile station 3000 handovers from the NodeB 2001B to the NodeB 2001C, the RNC 2000A transfers buffered data to the RNC 2000B. The RNC 2000B temporally stores the transferred data, and then transfers the stored data to the mobile station 3000.

By following this procedure, if there is any data which was not transferred to the mobile station 3000 in the handover and remains in the buffer, the data is transferred from the RNC 2000 to the mobile station 3000 via the target NodeB 2001.

Let's assume the case wherein the mobile station 3000 migrates from the LTE network to the UMTS network, i.e., to a different network. In such a case, data buffered in the eNodeB 1000 shall be transferred to the RNC 2000.

In this case, however, for transferring the data buffered in the source eNodeB 1000, the target RNC 2000 should have free memory space sufficient to store the data to be transferred. If the target RNC 2000 does not have free sufficient memory space, not all the data buffered in the source eNodeB 1000 may be transferred to the target RNC 2000 and some data may be lost.

Note that, in the case of a handover in a single communication network, the possibility of data loss is negligible since apparatuses typically have the comparable capacities. Even in the case of a handover in the single communication network, the same processing as that of the mobile communication network 10 of this embodiment may be carried out if the capacities of the apparatuses are different.

The mobile communication network 10 of this embodiment is configured such that a source eNodeB 1000 can transfer buffered data to the mobile station 3000, even if a target RNC 2000 can only accept smaller amount of data.

The source eNodeB 1000 in the mobile communication network 10 transfers the buffered data to the mobile station 3000 in two steps.

In the first step, during a handover, the source eNodeB 1000 directly transfers the buffered data to the mobile station 3000. As used therein, the term "during handover" means the time period from when the eNodeB 1000 receives a measurement report from the mobile station 3000 to notify that the reception intensity becomes weakened, to when typical handover processing completes.

In the second step, if there remains any data untransferred in the transfer processing in the first step, the entire remaining data is transferred to the target RNC 2000 by repeating transfer of data in an amount acceptable by the target RNC 2000 at that time. It is noted that the term "data remained untransferred in the transfer processing in the first step" includes any buffered data not directly transferred in the first step, including any data that could not be transferred for some reason. The data is transferred from the target RNC 2000 to the mobile station 3000.

In the above-described procedure, in the mobile communication network 10, redownload of content from a content server, e.g., the ISP 4000, is no more needed. Further, failure of direct transfer of data to a target RNC 2000 during a handover is reduced, since the transfer is initiated after the transferable amount of data is calculated. Further, any data that remained untransferred in a direct transfer or any data that could not be transferred in the directly transfer can be transferred to the target RNC 2000. This results in effective utilization of resources, such as channels and bandwidths.

Hereinafter, the mobile communication network 10 of an embodiment will be described with reference to the drawings.

Figure 2:
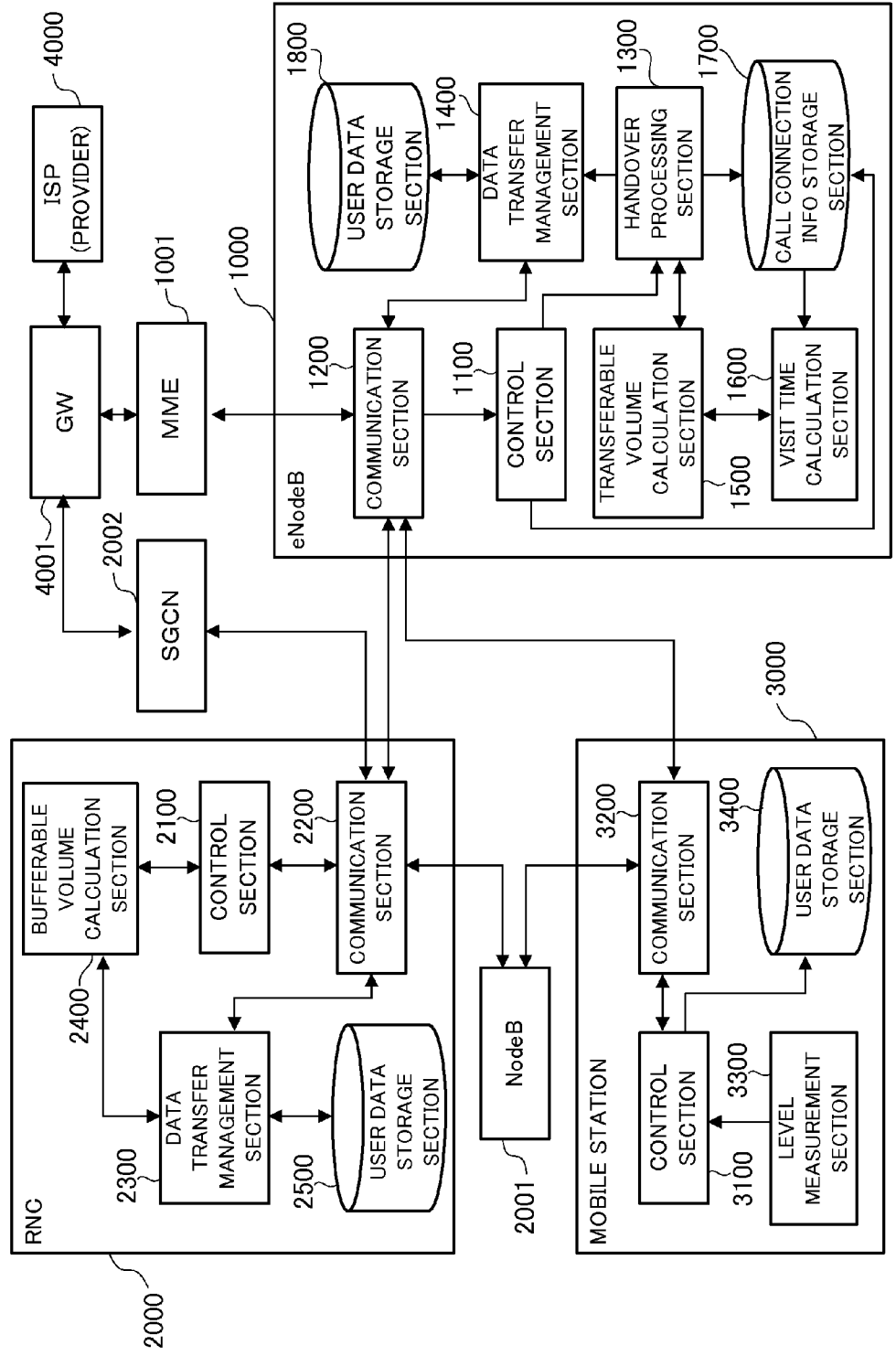
FIG. 2 is a block diagram illustrating an example of the functional configuration of an eNodeB in an LTE network, an RNC in a UMTS network, and a mobile station.

FIG. 2 is a block diagram illustrating an example of the functional configuration of an eNodeB 1000 in the LTE network, an RNC 2000 in the UMTS network, and a mobile station 3000.

The eNodeB 1000 includes a control section 1100, a communication section 1200, a handover processing section 1300, a data transfer management section 1400, a transferable volume calculation section 1500, a visit time calculation section 1600, a call connection information storage section 1700, and a user data storage section 1800.

The control section 1100 has functions which eNodeBs 1000 typically have. The control section 1100 also has functions, such as to control other functional sections for transferring buffered data to the mobile station 3000 upon a handover.

The communication section 1200 has a function to wirelessly communicate with the mobile station 3000. The communication section 1200 also has a function to perform wired or wireless communications with the RNC 2000 and the MME 1001.

The handover processing section 1300 has a function to perform typical handover processing. The handover processing section 1300 also has functions, such as to control other functional sections for transferring data in an amount transferable to the mobile station 3000 during a handover.

The data transfer management section 1400 has two major functions. The first one is a function to store data of a content downloaded from the ISP 4000 to the user data storage section 1800 for managing the data. The second one is a function to inquire the target RNC 2000 about the data amount the target RNC 2000 can accept, if there is any data to be transferred to the target RNC 2000 remained in the user data storage section 1800, and transfer the data.

The transferable volume calculation section 1500 has a function to calculate an amount of data transferable to the target RNC 2000 during a handover.

The visit time calculation section 1600 has a function to calculate a time period during which the data can be transferred to the target RNC 2000 during a handover.

Here, how the transferable volume calculation section 1500 determines an amount of data for directly transferring to the mobile station 3000 during a handover will be described with reference to FIG. 3.

Figure 3:
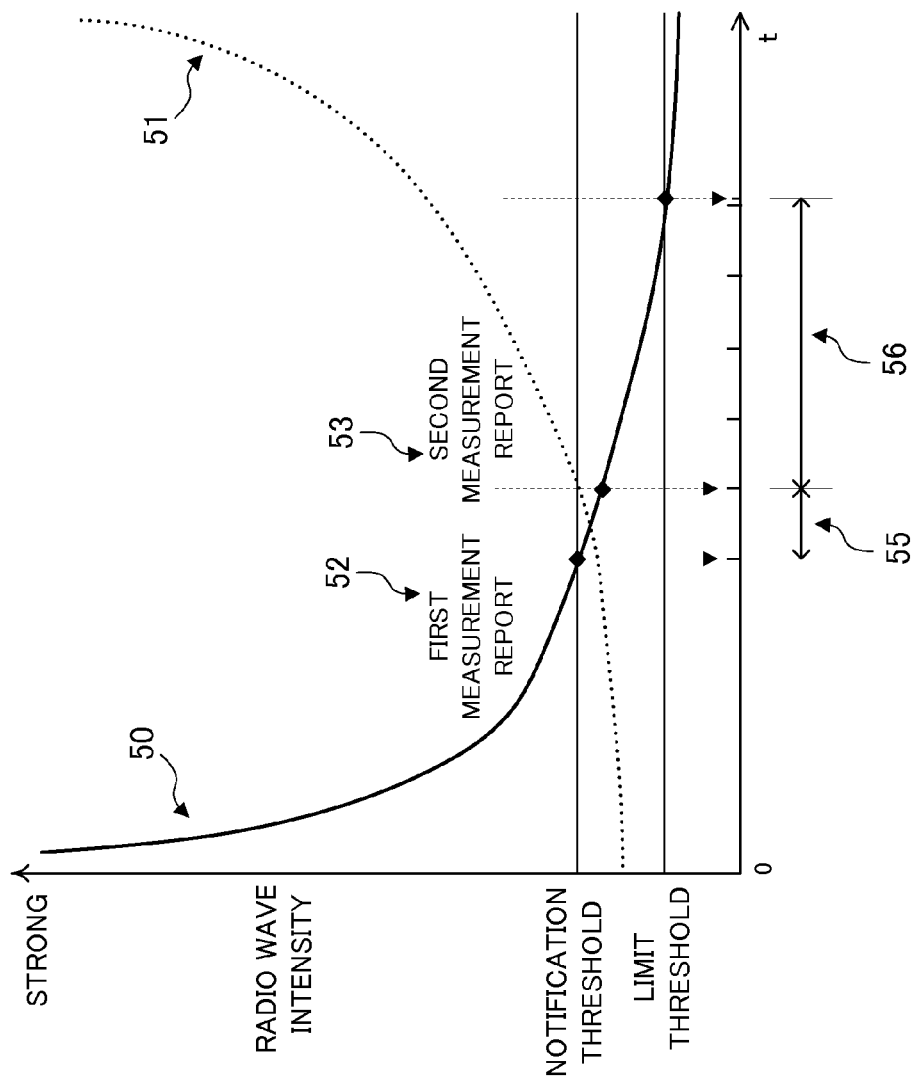
FIG. 3 is a graph indicating the radio wave intensities of signals received by the mobile station.
Figure 4:
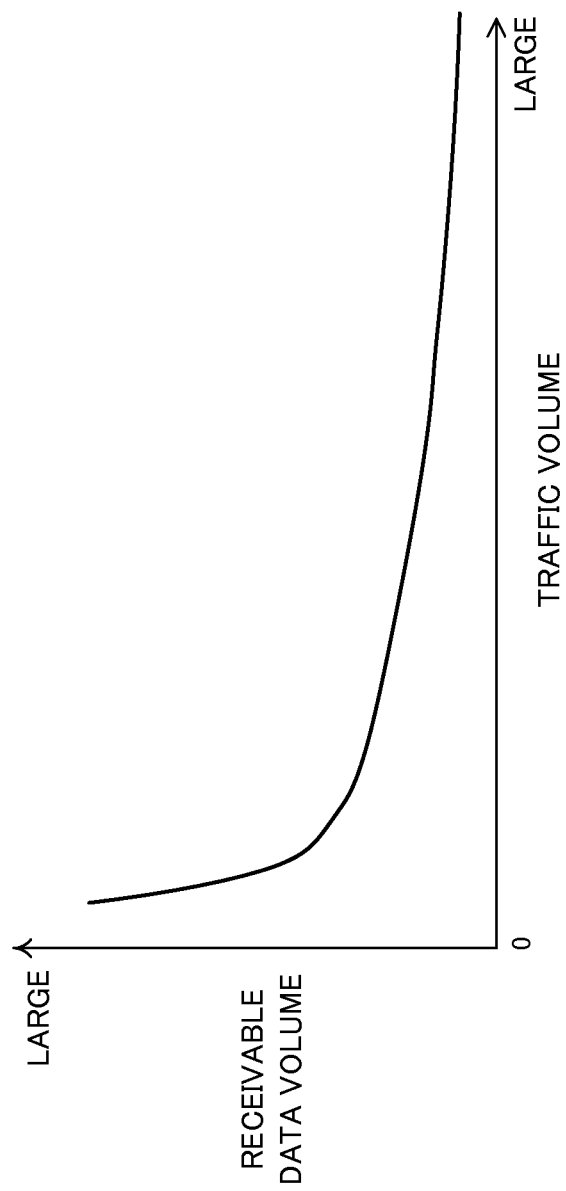
FIG. 4 is a graph indicating the relationship between the bufferable amount and the traffic amount.

The graph in FIG. 3 indicates the radio wave intensities of signals received by the mobile station 3000. The solid-line curve 50 indicates the radio wave intensity of signals from a source eNodeB 1000. The dotted-line curve 51 indicates the radio wave intensity of signals from a target NodeB 2001.

When the radio wave intensity of signals from the source eNodeB 1000 falls below a predetermined radio wave intensity (hereinafter referred to as the "notification threshold"), the mobile station 3000 sends a measurement report (refer to a first measurement report 52), including the measured current radio wave intensity, for requesting a handover.

In a typical process, upon receiving the measurement report, the source eNodeB 1000 would immediately initiate handover processing.

However, in this embodiment, the source eNodeB 1000 in the mobile communication network 10 initiates handover processing after a second measurement report (refer to a second measurement report 53) is received.

The visit time calculation section 1600 in the source eNodeB 1000 determines the interval 55 from when the first measurement report 52 was received, to when the second measurement report 53 was received. Based on the interval 55 and the radio wave intensities contained in the first measurement report 52 and the second measurement report 53, visit time 56 until the communication with the mobile station 3000 becomes unavailable is determined.

This visit time 56 is the time period from when the second measurement report 53 was received, until when the quality level of radio waves received by the mobile station 3000 from the source eNodeB 1000 reaches a certain limit. In FIG. 3, this limit quality level is indicated as the "limit threshold".

The limit threshold is determined in advance from the intensity of the radio waves, the noises, and the loss ratio of data transfer, by the network carrier.

A certain quality level of radio waves that is better than this limit threshold is defined as a notification threshold, and that notification threshold is notified to the mobile station 3000, by being contained in a notification signal. Notification signals are signals sent by an eNodeB 1000 to all mobile stations 3000 located in the cells of that eNodeB 1000 to notify the mobile stations 3000 of various types of information.

An example equation used to calculate a visit time 56 is as follows. In the equation, the radio wave intensity included in the first measurement report 52 is referred to as the "first radio wave intensity" and the radio wave intensity included in the second measurement report 53 is referred to as the "second radio wave intensity".

Visit time 56=(Limit threshold−Notification threshold)/((First radio wave intensity−Second radio wave intensity)/Interval 55)

The transferable volume calculation section 1500 determines an amount of data transferable to the mobile station 3000 from the visit time 56 and the data transfer rate.

The call connection information storage section 1700 has a function to store information about calls being made by mobile stations 3000 managed by the eNodeB 1000.

The user data storage section 1800 has a function to store data of a content being downloaded from the ISP 4000.

Next, the RNC 2000 includes a control unit 2100, a communication section 2200, a data transfer management section 2300, a bufferable volume calculation section 2400, and a user data storage section 2500.

The control section 2100 has functions which RNCs 2000 typically have. The control section 2100 also has functions, such as to control other functional sections for receiving data from an eNodeB 1000 upon a handover.

The communication section 2200 has a function to wirelessly communicate with the mobile station 3000 via a NodeB 2001. The communication section 2200 also has a function to perform wired or wireless communications with the NodeB 2001, the SGCN 2002, and the eNodeB 1000.

The data transfer management section 2300 has two major functions. The first one is a function to store data transferred from the eNodeB 1000 to the user data storage section 2500 for managing the data, upon a handover. The second one is a function to store data of a content downloaded from the ISP 4000 to the user data storage section 2500 for managing the data.

That is, after the handover, the target RNC 2000 may receive data being transferred via the two routes, as the data being downloaded from the ISP 4000.

The data transferred from the source eNodeB 1000 is sent only when there remains any data untransferred during the handover.

The bufferable volume calculation section 2400 has a function to calculate an acceptable data amount.

The acceptable data amount is inquired by the source eNodeB 1000 after the handover only when there remains any data untransferred during the handover.

The bufferable volume calculation section 2400 in the target RNC 2000 calculates the acceptable data amount, based on the traffic amount of calls which the target RNC 2000 is making, the free space in the buffer, and the like. In other words, as depicted in the graph indicating the relationship between the bufferable amount and the traffic amount in FIG.

4, the acceptable data amount decreases as the traffic amount increases, since the buffered data volume used increases.

An example equation used to calculate the acceptable data amount is as follows:

Bufferable amount=Capacity of the buffer−Current usage amount−(Call amount*Average data amount)

wherein Call amount: Total call count per unit time; and
Average data amount: Average buffer usage amount per call The user data storage section 2500 has a function to store data of a content being downloaded from the ISP 4000.

The mobile station 3000 includes a control unit 3100, a communication section 3200, a level measurement section 3300, and a user data storage section 3400.

The control unit 3100 has call or mail, or other functions which mobile telephones typically have. The control unit 3100 also has functions, such as to generate a measurement report and send the report upon a handover.

The communication section 3200 has a function to wirelessly communicate with the eNodeB 100 and the NodeB 2001.

The level measurement section 3300 has a function to measure radio wave intensities of signals received from either of the base stations, i.e., the eNodeB 1000 or the NodeB 2001 located nearby, while communicating with the eNodeB 1000 or the NodeB 2001. The level measurement section 3300 also has a function to, when the radio wave intensity of signals received from the source eNodeB 1000 or the source NodeB 2001 falls below the notification threshold (refer to FIG. 3), notify the control unit 3100 of the radio wave intensity falling below the threshold.

The user data storage section 3400 has a function to store data of a content being downloaded from the ISP 4000.

All or some of the functions described above are embodied by CPUs in the eNodeBs 1000, the RNCs 2000, and the mobile station 3000 by performing programs stored in the respective memories of the eNodeBs 1000, the RNCs 2000, and the mobile station 3000.

Next, data used in the mobile communication network 10 of an embodiment will be described with reference to FIGS. 5 and 6.

Figure 5:
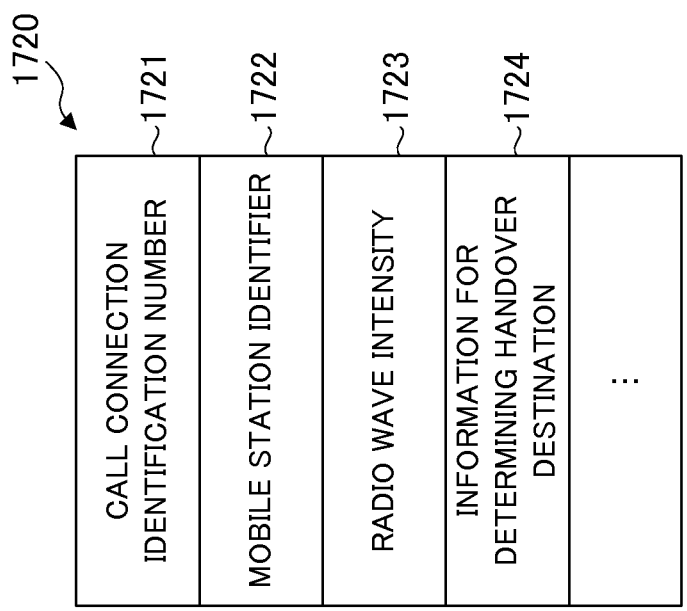
FIG. 5 is a diagram illustrating an example of the structure and contents of a measurement report.

FIG. 5 is a diagram illustrating an example of the structure and contents of a measurement report 1720.

A measurement report 1720 is sent by the mobile station 3000 to an eNodeB 1000 with which the mobile station 3000 is communicating, i.e., a source eNodeB 1000.

When the radio wave intensity of signals from the source eNodeB 1000 falls below predetermined radio wave intensity, i.e., the notification threshold (refer to FIG. 3), the mobile station 3000 generates a measurement report 1720 and sends the report. The notification threshold is notified by an eNodeB 1000 to mobile stations 3000 located within the cells of that eNodeB 1000, in notification information regularly sent by the eNodeB 1000 to the mobile stations 3000.

Once the mobile station 3000 sends the measurement report 1720 to the source eNodeB 1000, the mobile station 3000 sends measurement reports 1720 repeatedly at a predetermined interval until a handover instruction is received, as long as the radio wave intensity is smaller than the notification threshold.

A measurement report 1720 includes a call connection identification number 1721, a mobile station identifier 1722, a radio wave intensity 1723, and information 1724 for determining a handover destination.

The call connection identification number 1721 indicates the number for identifying a call connection passed from the eNodeB 1000.

The mobile station identifier 1722 indicates an identifier of the mobile station 3000 which is the sender of the measurement report 1720.

The radio wave intensity 1723 indicates the radio wave intensity of a signal from the source eNodeB 1000, measured by the mobile station 3000 identified by the mobile station identifier 1722.

The information 1724 for determining a handover destination indicates information required for determining a handover destination, such as signal reception intensities from eNodeBs 1000 other than the source eNodeB 1000 and the reception intensity of a signal from the NodeB 2001.

Figure 6:
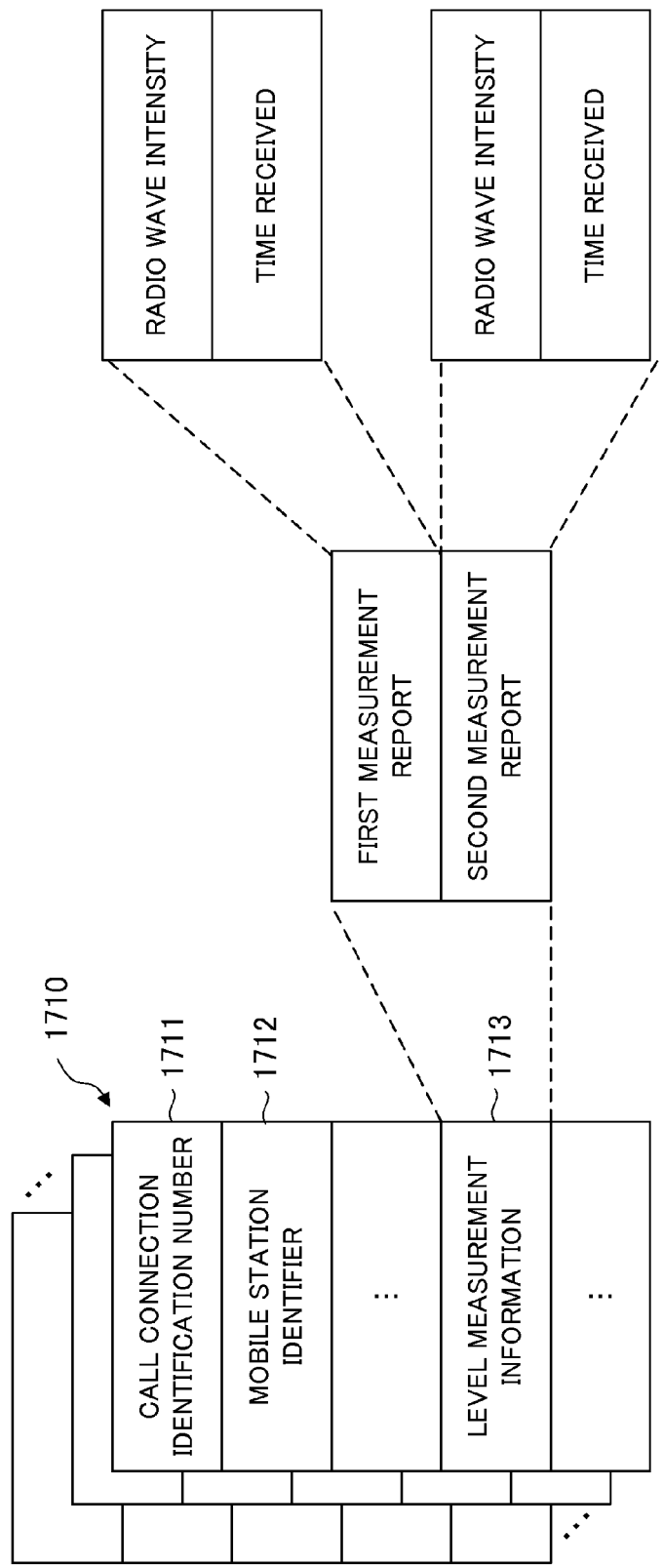
FIG. 6 is a diagram illustrating an example of the structure and contents of call connection management information.

FIG. 6 is a diagram illustrating an example of the structure and contents of call connection management information 1710.

Call connection management information 1710 is generated for each "call", i.e., for each transaction. In the case of the call, a "single transaction" is a transaction from when the call is connected to a called party, to when the call is disconnected. In the case of downloading of a content, a "single transaction" is a transaction from when a connection to the ISP 4000 is made, to when the download completes and the connection is disconnected.

Call connection management information 1710 for each "call" managed by the eNodeB 1000 is stored in the call connection information storage section 1700.

Call connection management information 1710 includes a call connection identification number 1711, a mobile station identifier 1712, and level measurement information 1713.

The call connection identification number 1711 indicates the number for identifying a call connection. A call connection identification number 1711 is allocated by the eNodeB 1000 for each connection managed by the eNodeB 1000.

The mobile station identifier 1712 is the identifier of a mobile station 3000 engaging in the call identified by the call connection identification number 1711, and the mobile station 3000 is the sender of the measurement report 1720.

The level measurement information 1713 indicates information about the radio wave intensity measured by the mobile station 3000 identified by the mobile station identifier 1712. Specifically, the level measurement information 1713 contains the radio wave intensity 1723 included in the measurement report 1720 sent by the mobile station 3000 identified by the mobile station identifier 1712.

The level measurement information 1713 contains first measurement information including the radio wave intensity 1723 included in the measurement report 1720 received first, and the time when that first measurement report 1720 was received; and second measurement information including the radio wave intensity 1723 included in the measurement report 1720 received next, and that time when that next measurement report 1720 was received.

Hereinafter, the operation of the mobile communication network 10 of an embodiment will be described with reference to FIGS. 7 and 8.

First, data transfer processing in the first step during a handover will be described with reference to FIG. 7, and then data transfer processing in the second step after the handover will be described with reference to FIG. 8.

Figure 7:
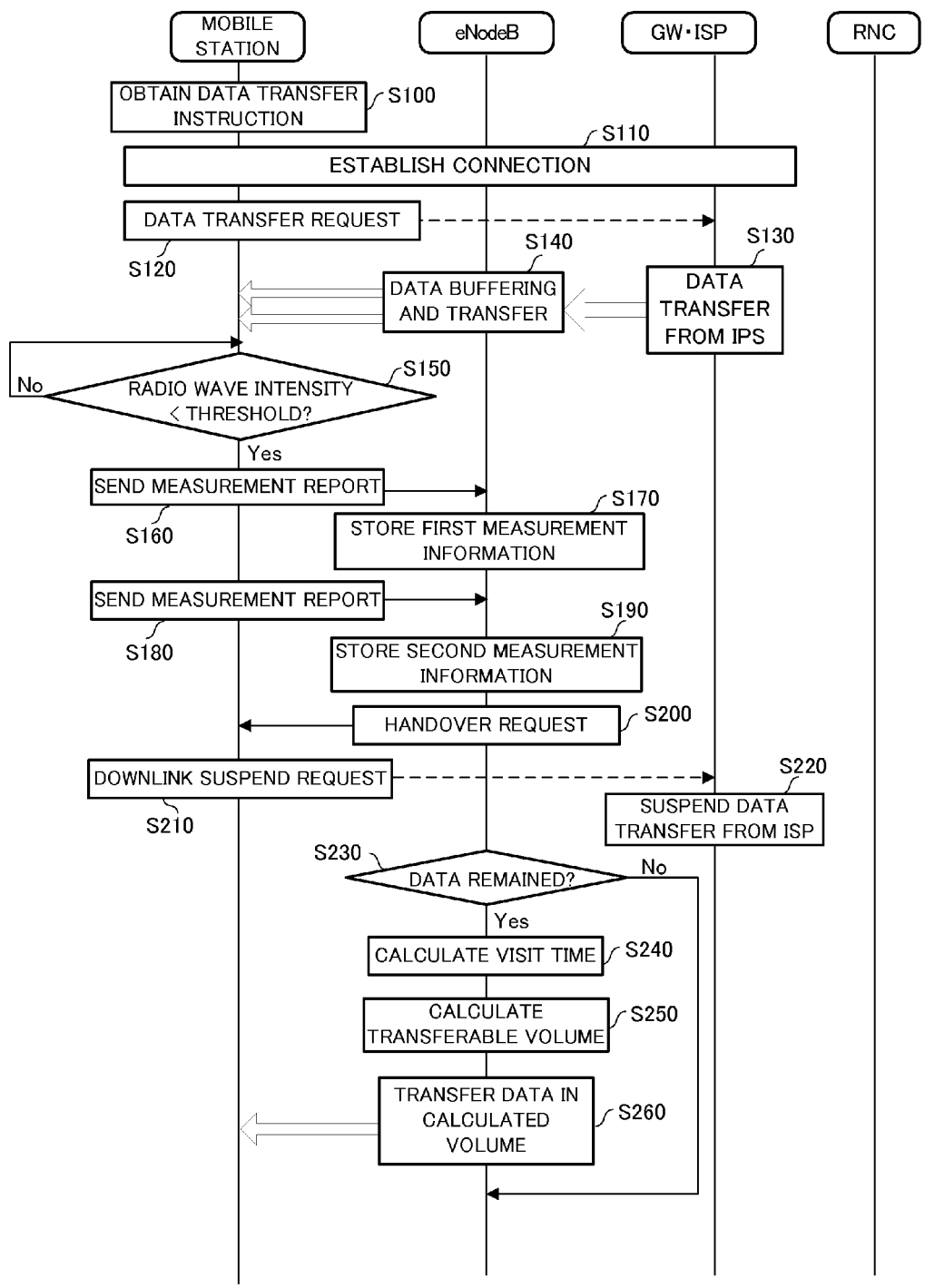
FIG. 7 is a flowchart illustrating data transfer processing upon a handover.

FIG. 7 is a flowchart illustrating data transfer processing upon a handover. In FIG. 7, the outlined arrows indicate data of a content transferred by the bearer service. This also applies to FIG. 8.

A user of a mobile station 3000 instructs to download data of a certain content by operating the keys on the mobile station 3000.

In response to receiving an instruction to download the data of the content (step S100), the control unit 3100 in the mobile station 3000 establishes a connection by means of the radio resource control (RRC) with the eNodeB 1000A through the communication section 3200.

Thereafter, the control unit 3100 in the mobile station 3000 establishes a connection with the ISP 4000, by way of the MME 1001 and the GW 4001 (step S110).

Once establishing the connection with the ISP 4000, the control unit 3100 in the mobile station 3000 requests the ISP 4000 to transfer the data of the content (step S120).

The requested ISP 4000 initiates transmission of the data to the mobile station 3000, by way of the GW 4001 and the MME 1001 (step S130).

The communication section 1200 in the eNodeB 1000A receives the data of the content via the MME 1001, and passes the data to the data transfer management section 1400.

In response to receiving the data, the data transfer management section 1400 stores the received data into the user data storage section 1800. The data is stored, related to the destination of the mobile station 3000.

The data transfer management section 1400 reads the data stored in the user data storage section 1800 in sync with the communication speed with the mobile station 3000, and transfers the read data to the mobile station 3000 (step S140).

The processing in step S130 and step S140 are repeated until a suspend request is issued from the mobile station 3000 (step S210, which will be later).

In response to receiving the data via the communication section 3200 in the mobile station 3000, the control unit 3100 stores the received data to the user data storage section 3400.

The level measurement section 3300 measures the radio wave intensity of a signal from the source eNodeB 1000A. If the measured radio wave intensity falls below the notification threshold (refer to FIG. 3) (step S150: Yes), the level measurement section 3300 passes the measured radio wave intensity to the control unit 3100 and notifies that the intensity falls below the notification threshold. If the measured radio wave intensity is equal to or greater than the notification threshold (step S150: No), the level measurement section 3300 does not notify the control unit 3100.

The level measurement section 3300 continues to measure the radio wave intensity of a signal from the source eNodeB 1000A, irrespective of the actual value of the measured radio wave intensity. In an embodiment, it is assumed that the radio wave intensity is gradually reduced.

The control unit 3100 notified by the level measurement section 3300 generates a measurement report 1720.

Specifically, the control unit 3100 sets the number passed from the eNodeB 1000 upon the connection, in the call connection identification number 1721 in the measurement report 1720. The control unit 3100 sets the identifier of the mobile station 3000 in the mobile station identifier 1722, and sets the radio wave intensity passed from the level measurement section 3300 in the radio wave intensity 1723. Further, the control unit 3100 obtains, from the level measurement section 3300 and the like, information for determining the handover destination, such as the radio wave intensities of signals from nearby eNodeBs 1000, and sets the information in the information for determining the handover destination 1724. It is noted that the control unit 3100 knows the identifier of the mobile station 3000 in advance.

After generating the measurement report 1720, the control unit 3100 sends the generated measurement report 1720 to the source eNodeB 1000A (step S160).

In response to receiving the measurement report 1720 via the communication section 1200 in the eNodeB 1000A, the control section 1100 passes the received measurement report 1720, and the time when the measurement report 1720 was received, to the handover processing section 1300, for requesting handover processing.

The requested handover processing section 1300 stores the value of the radio wave intensity set in the radio wave intensity 1723 in the measurement report 1720 received from the control section 1100, and the time when the report was received, as first measurement information (step S170).

Specifically, the requested handover processing section 1300 selects connection management information 1710 stored in the call connection information storage section 1700, which has the same call connection identification number 1711 as the number set in the call connection identification number 1721 in the received measurement report 1720. The handover processing section 1300 then stores the value of the radio wave intensity set in the radio wave intensity 1723 in the measurement report 1720 and the time received, as first measurement information of the level measurement information 1713 in the selected call connection management information 1710. Hereinafter, the call connection management information 1710 is referred to as the "call connection management information 1710 of the mobile station 3000".

An automatic cursor section 3300 of the mobile telephone 3000 measures the radio wave intensity of a signal from the source eNodeB 1000A once again, after a predetermined time elapses after the previous measurement. Since the measured radio wave intensity of the signal from the source eNodeB 1000A falls below the notification threshold, the control unit 3100 is notified that the intensity falls below the threshold.

The notified control unit 3100 generates a measurement report 1720, and sends the generated measurement report 1720 to the source eNodeB 1000A (step S180).

In response to receiving the measurement report 1720 via the communication section 1200 in the eNodeB 1000A, the control section 1100 passes the received measurement report 1720 and the time received to the handover processing section 1300, to request handover processing.

The requested handover processing section 1300 stores the value of the radio wave intensity set in the radio wave intensity 1723 in the measurement report 1720 received from the control section 1100, and the time when the report was received, as second measurement information in the call connection management information 1710 of the mobile station 3000 (step S190).

After storing the second measurement information, the handover processing section 1300 sends a handover request to the mobile station 3000 (step S200). The handover processing section 1300 initiates handover processing.

In response to receiving the handover request, the control unit 3100 in the mobile station 3000 initiates the handover processing and sends a downlink suspend, i.e., a request to suspend data transfer of the content, to the GW 4001 (step S210).

It is noted that the handover processing is performed in the mobile station 3000, the source eNodeB 1000A, and the target RNC 2000, in parallel with the data transfer processing which will be described below.

In response to receiving the suspend request, the GW 4001 suspends the data transfer to the source eNodeB 1000A, until a target apparatus, i.e., the RNC 2000A in this embodiment, is notified from the source eNodeB 1000A in the handover processing (step S220).

After sending handover request to the mobile station 3000, the handover processing section 1300 in the source eNodeB 1000A performs the data transfer processing, which will be describe below, in parallel with typical handover processing.

The handover processing section 1300 inquires the data transfer management section 1400 whether there remains any data to be transferred to the mobile station 3000.

Specifically, the handover processing section 1300 obtains the identifier for the mobile station 3000 from the mobile station identifier 1712 in the call connection management information 1710, and inquires the data transfer management section 1400 whether there remains any data to be transferred to the mobile station 3000 identified by the obtained identifier.

The inquired data transfer management section 1400 notifies the handover processing section 1300 that there remains data or not, by looking up the user data storage section 1800.

If the handover processing section 1300 is notified that there remains data (step S230: Yes), the handover processing section 1300 requests the transferable volume calculation section 1500 to calculate the transferable data amount until the limit threshold (refer to FIG. 3) is reached.

The requested transferable volume calculation section 1500 requests the visit time calculation section 1600 to calculate the visit time 56 (refer to FIG. 3).

The requested visit time calculation section 1600 calculates the visit time 56 by looking up the call connection management information 1710 of the mobile station 3000 stored in the call connection information storage section 1700. Specifically, the requested visit time calculation section 1600 calculates the visit time 56, based on first measurement information and second measurement information stored as the level measurement information 1713 (step S240).

After calculating the visit time 56, the visit time calculation section 1600 passes the calculated visit time 56 to the transferable volume calculation section 1500. The transferable volume calculation section 1500 calculates the transferable data amount, based on the received visit time (step S250).

After calculating transferable data amount, the transferable volume calculation section 1500 passes the calculated data amount to the handover processing section 1300. The handover processing section 1300 passes the received data amount to the data transfer management section 1400, requesting the data transfer management section 1400 to transfer data to the mobile station 3000.

The requested data transfer management section 1400 reads data from the user data storage section 1800, in the data amount passed, and transfers the read data to the mobile station 3000 (step S260).

Otherwise, if the handover processing section 1300 is notified that there remains no data (step S230: No), no data transfer processing is performed.

Next, data transfer processing after the handover will be described with reference to FIG. 8.

Figure 8:
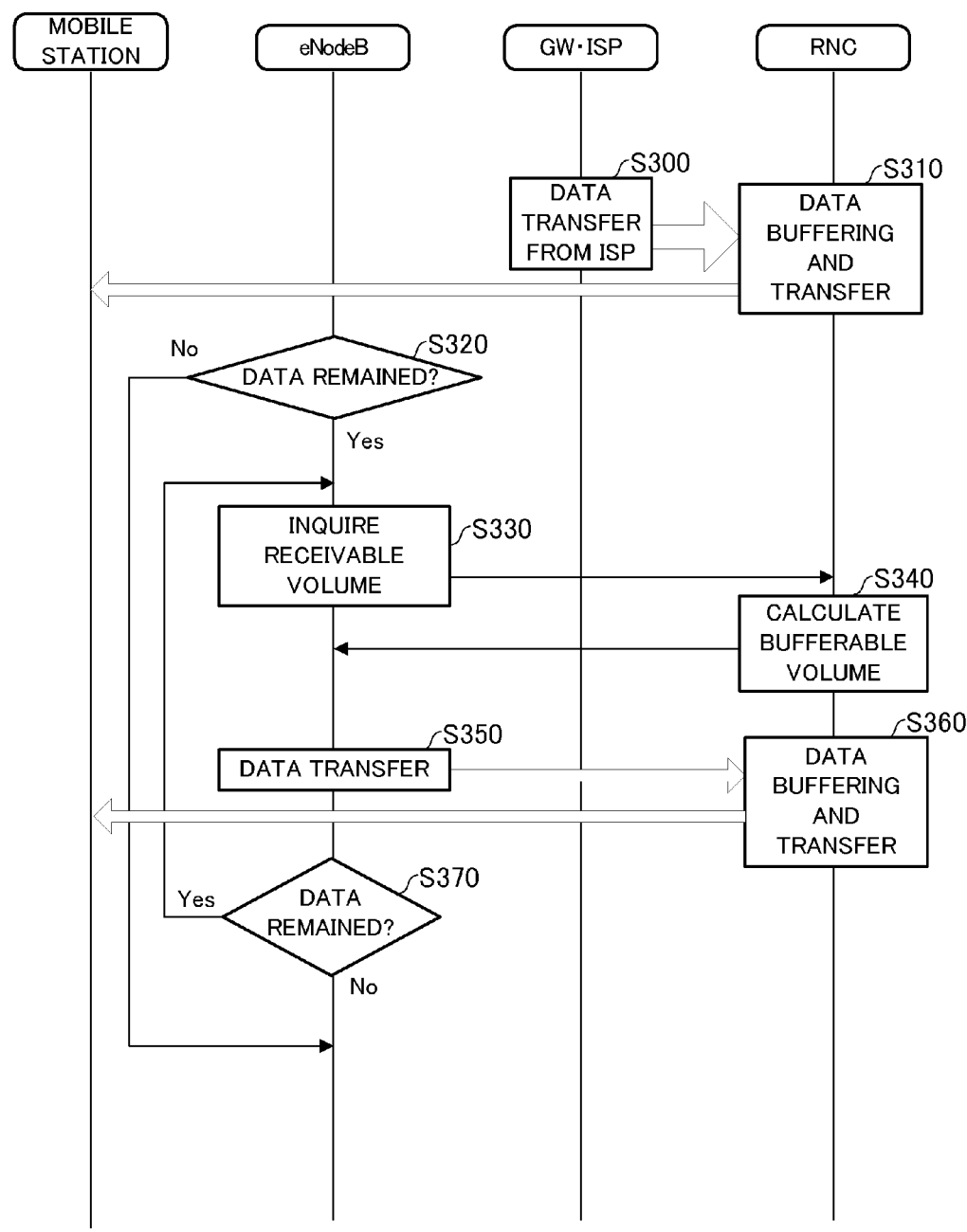
FIG. 8 is a flowchart illustrating data transfer processing after the handover.

FIG. 8 is a flowchart illustrating data transfer processing after the handover.

After the handover, the GW 4001 initiates transfer of data of a content to the RNC 2000A, by way of the SGCN 2002 (step S300).

The communication section 2200 in the RNC 2000A receives the data of the content via the SGCN 2002, and passes the data to the data transfer management section 2300.

In response to receiving the data, the data transfer management section 2300 stores the data in the user data storage section 2500. The data is stored, related to the destination of the mobile station 3000.

The data transfer management section 2300 reads the data stored in the user data storage section 2500 in sync with the communication speed with the mobile station 3000, and transfers the read data to the mobile station 3000 via the NodeB 2001A (step S310).

In other words, the mobile station 3000 can continue to download the data of the content from the ISP 4000, even after the handover.

After the handover processing is completed, the handover processing section 1300 in the source eNodeB 1000A requests the data transfer management section 1400 to transfer data to be transferred to the mobile station 3000, if there remains any data. At this time, the handover processing section 1300 indicates the identifier of the handovering mobile station 3000, and the destination of the target RNC 2000A.

It is noted that the handover processing section 1300 reads the identifier of the mobile station 3000 set in the mobile station identifier 1712 and saves the identifier, before deleting the call connection management information 1710 of the mobile station 3000 in the handover processing.

The requested data transfer management section 1400 looks up the user data storage section 1800. If there remains data to be transferred to the notified mobile station (step S320: Yes), the data transfer management section 1400 inquires the target RNC 2000A about the acceptable data amount (step S330). If there is no data to be transferred (step S320: No), no data transfer processing is performed.

In response to receiving the inquiry via the communication section 2200 in the RNC 2000A, the control unit 2100 requests the bufferable volume calculation section 2400 to calculate the acceptable data amount.

The requested bufferable volume calculation section 2400 inquires the data transfer management section 2300 about the available free space.

The inquired data transfer management section 2300 obtains the available free space by looking up the user data storage section 2500 and returns the value to the bufferable volume calculation section 2400.

In response to obtaining the available free space, the bufferable volume calculation section 2400 calculates the acceptable data amount and returns the result to the control unit 2100.

In response to obtaining the acceptable data amount, the control unit 2100 sends the acceptable data amount to the source eNodeB 1000A (step S340).

In response to receiving the acceptable data amount via the communication section 1200 in the source eNodeB 1000A, the data transfer management section 1400 reads data from the user data storage section 1800 in the received data amount, and transfers the read data to the target RNC 2000A (step S350).

Once transferring the data, the data transfer management section 1400 inquires the acceptable data amount to the target RNC 2000A and repeats the processing in steps S330-S370 if there still remains any data (step S370: Yes).

If all data has been transferred (step S370: No), the data transfer processing is terminated.

The data transfer management section 2300 in the source RNC 2000A stores the content data transferred from the source eNodeB 1000A in the user data storage section 2500. The data transfer management section 2300 reads the data in sync with the communication speed with the mobile station 3000, and transfers the read data to the mobile station 3000 via the NodeB 2001A (step S360).

Although an embodiment of the present invention has been described, the present invention is not limited to the above-described form and the following modifications may be made.

(1) Although the handover processing is initiated after two measurement reports are received in the embodiment, the handover processing may be initiated after a first measurement report is received if there remains no data in the user data storage section 1800 to be transferred to the mobile station 3000.

(2) Although a handover from an LTE network to a UMTS network has been described in the embodiment, a handover may take place within in a single network. A handover from the UMTS network to the LTE network may also be possible. Further, a handover to another communication network may also be made.

(3) All or some of the components of the eNodeBs 1000 and the like, as depicted in FIG. 2, may be embodied in an integrated circuit in a single chip or multiple chips.

(4) All or some of the components of the eNodeBs 1000 and the like, as depicted in FIG. 2, may be embodied by a computer program or any other means.

If a computer program is used, the computer program may be stored in any recording media, such as memory cards and CD-ROMs, and is read by a computer for execution. Alternatively, the computer program may be downloaded through a network for execution.

The functions of the control section 1100, the communication section 1200, the handover processing section 1300, the data transfer management section 1400, and the transferable volume calculation section 1500, and the visit time calculation section 1600 in the eNodeBs 1000 may be embodied by a processor. Further, the functions of the control unit 2100, the communication section 2200, the data transfer management section 2300, and the bufferable volume calculation section 2400 in the RNCs 2000 may be embodied by a processor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A radio access network comprising:
a first base station, wherein the first base station includes:
    a first storage that stores data to be transferred from the first base station to a mobile station;
    a receiver that receives messages from the mobile station, each of the messages being transmitted when an intensity of a signal received by the mobile station from the first base station falls below a threshold as the mobile station migrates, each of the messages indicating the intensity;
    a processor that, when a first message of the messages is received by the receiver at a first time point and a second message of the messages is received by the receiver at a second time point after the first time point,
    estimates a time period from the second time point until the intensity reaches a limit threshold based on a first intensity indicated by the first message, a second intensity indicated by the second message, and a time interval between the first time point and the second time point, and
    calculates, based on the estimated time period, an amount of data in order to prevent packet loss of the data during a handover, the data transferable from the first base station to the mobile station until a communication between the first base station and the mobile station becomes unavailable; and
    a transmitter that transfers the stored data to the mobile station, an amount of the transferred data being equal to or smaller than the calculated amount.

2. The radio access network according to claim 1, wherein the processor makes, based on the messages received by the receiver, the mobile station initiate a communication with a second base station, and
    wherein the transfer by the transmitter is performed before the mobile station initiates the communication with the second base station.

3. The radio access network according to claim 2, further comprising a second storage that stores data to be transferred from the second base station to the mobile station,
    wherein the receiver receives an amount of data storable to the second storage, and
    wherein the transmitter transfers the data stored in the first storage to the second storage, an amount of the data transferred to the second storage being equal to or smaller than the received amount.

4. The radio access network according to claim 3, wherein a second communication network comprising the second storage and the second base station is different in network type from a first communication network comprising the first storage and the first base station.

5. A base station comprising:
    a storage that stores data to be transferred from the base station to a mobile station;
    a receiver that receives messages from the mobile station, each of the messages being transmitted when an intensity of a signal received by the mobile station from the base station falls below a threshold as the mobile station migrates, each of the messages indicating the intensity;
    a processor that, when a first message of the messages is received by the receiver at a first time point and a second message of the messages is received by the receiver at a second time point after the first time point,
    estimates a time period from the second time point until the intensity reaches a limit threshold based on a first intensity indicated by the first message, a second intensity indicated by the second message, and a time interval between the first time point and the second time point, and
    calculates, based on the estimated time period, an amount of data in order to prevent packet loss of the data during a handover, the data transferable from the base station to the mobile station until a communication between the base station and the mobile station becomes unavailable; and
    a transmitter that transfers the stored data to the mobile station, an amount of the transferred data being equal to or smaller than the calculated amount.

6. A data transfer method in a radio access network including a base station and a mobile station which communicates with the base station, the data transfer method comprising:

at the base station, receiving messages from the mobile station, each of the messages being transmitted when an intensity of a signal received by the mobile station from the base station falls below a threshold as the mobile station migrates, each of the messages indicating the intensity;

at the base station, when a first message of the messages is received at a first time point and a second message of the messages is received at a second time point after the first time point, estimating a time period from the second time point until the intensity reaches a limit threshold based on a first intensity indicated by the first message, a second intensity indicated by the second message, and a time interval between the first time point and the second time point, and calculating, based on the estimated time period, an amount of data in order to prevent packet loss of the data during a handover, the data transferable from the base station to the mobile station until a communication between the base station and the mobile station becomes unavailable; and at the base station, transferring the data to the mobile station, an amount of the transferred data being equal to or smaller than the calculated amount.

7. A non-transitory computer readable storage medium storing a program causing a computer to execute a process, the process comprising:

at a base station, receiving messages from a mobile station, each of the messages being transmitted when an intensity of a signal received by the mobile station from the base station falls below a threshold as the mobile station migrates, each of the messages indicating the intensity;

at the base station, when a first message of the messages is received at a first time point and a second message of the messages is received at a second time point after the first time point, estimating a time period from the second time point until the intensity reaches a limit threshold based on a first intensity indicated by the first message, a second intensity indicated by the second message, and a time interval between the first time point and the second time point, and calculating, based on the estimated time period, an amount of data in order to prevent packet loss of the data during a handover, the data transferable from the base station to the mobile station until a communication between the base station and the mobile station becomes unavailable; and at the base station, transferring the data to the mobile station, an amount of the transferred data being equal to or smaller than the calculated amount.

* * * * *